(12) United States Patent
Kim et al.

(10) Patent No.: US 10,959,428 B2
(45) Date of Patent: Mar. 30, 2021

(54) HEMATOPHAGOUS ARTHROPOD REPELLENT COMPOSITION

(71) Applicant: WOOJUNG BIO INC., Gyeonggi-do (KR)

(72) Inventors: Soon-Il Kim, Gyeonggi-do (KR); Byung Nyun Chun, Gyeonggi-do (KR); Jung Kyu Suh, Gyeonggi-do (KR); Seong Yeol Park, Jeollabuk-do (KR)

(73) Assignee: WOOJUNG BIO INC., Gyeonggi-do (KR)

( * ) Notice: Subject to any disclaimer, the term of this patent is extended or adjusted under 35 U.S.C. 154(b) by 0 days.

(21) Appl. No.: 16/485,935

(22) PCT Filed: Jan. 12, 2018

(86) PCT No.: PCT/KR2018/000577
§ 371 (c)(1),
(2) Date: Aug. 14, 2019

(87) PCT Pub. No.: WO2018/151419
PCT Pub. Date: Aug. 23, 2018

(65) Prior Publication Data
US 2020/0015479 A1 Jan. 16, 2020

(30) Foreign Application Priority Data
Feb. 15, 2017 (KR) .................. 10-2017-0020600

(51) Int. Cl.
| | | |
|---|---|---|
| *A01N 31/08* | (2006.01) | |
| *A01N 65/10* | (2009.01) | |
| *A01N 65/12* | (2009.01) | |
| *A01N 65/36* | (2009.01) | |
| *A01N 65/40* | (2009.01) | |

(52) U.S. Cl.
CPC ............. *A01N 31/08* (2013.01); *A01N 65/10* (2013.01); *A01N 65/12* (2013.01); *A01N 65/36* (2013.01); *A01N 65/40* (2013.01)

(58) Field of Classification Search
CPC ........ A01N 31/08; A01N 65/10; A01N 65/12; A01N 65/36; A01N 65/40
See application file for complete search history.

(56) References Cited

U.S. PATENT DOCUMENTS

| | | | | |
|---|---|---|---|---|
| 7,846,464 B2 * | 12/2010 | Darling | .................. | A01N 65/44 424/405 |
| 2015/0216182 A1 * | 8/2015 | Brown | .................. | A01N 31/14 424/405 |

FOREIGN PATENT DOCUMENTS

| | | |
|---|---|---|
| CN | 101743963 B | 8/2012 |
| JP | 2004-238389 A | 8/2004 |
| KR | 10-2005-0075443 A | 7/2005 |
| KR | 10-0756397 B1 | 9/2007 |
| KR | 10-2009-0130037 A | 12/2009 |
| KR | 10-2012-0080138 A | 7/2012 |
| KR | 10-2015-0056537 A | 5/2015 |
| WO | WO 02/05646 A2 | 1/2002 |
| WO | WO 2009/117623 A2 | 9/2009 |
| WO | WO 2012/021531 A2 | 2/2012 |
| WO | WO 2013/063534 A1 | 5/2013 |
| WO | WO 2014/028835 A2 | 2/2014 |
| WO | WO 2015/067646 A1 | 5/2015 |
| WO | WO 2015/067647 A1 A1 | 5/2015 |
| WO | WO 2015/116801 A2 | 8/2015 |

OTHER PUBLICATIONS

Maeda et al. Scientific reports (2016.*
International Search Report for PCT/KR20181000577 dated Apr. 17, 2018.
Tracy M. Katz, MD et al., "Insect repellents: Historical perspectives and new developments", J Am Acad Dermatol vol. 58, pp. 865-871, 2008.
E.T. McCabe et al., "Insect repellents. III. N,N-Diethylamides", Journal of Organic Chemistry, vol. 19 (4), pp. 493-498, 1954.
Service, M.W., "Management of vectors" In: Youdeowei, A.,Service, M.W. (Eds.), Pest and Vectors Management in the Tropics, pp. 265-280, 1983.
European Search Report for EP18754300 dated Oct. 23, 2020 from European patent office in a counterpart European patent application.
A. A. Khan et al. "Addition of Vanillin to Mosquito Repellents to Increase Protection Time" Mosquito News, vol. 35, No. 2, pp. 223-225, 1975.
Donald R. Barnard et al. "Laboratory Evaluation of Mosquito Repellents Against Aedes albopictus, Culex nigripalpus, and Ochlerotatus triseriatus " J. Med. Entomology, vol. 41, No. 4, pp. 726-730, 2004.

\* cited by examiner

*Primary Examiner* — Shirley V Gembeh
(74) *Attorney, Agent, or Firm* — The PL Law Group, PLLC

(57) ABSTRACT

A hematophagous arthropod repellent composition includes 3,4-dimethoxybenzaldehyde or vanillin acetate as an effective ingredient. The repellent composition is against hematophagous arthropods which transmit diseases to animals including humans or directly cause discomfort or stress by bloodsucking. The hematophagous arthropod repellent composition not only has excellent repellency against hematophagous arthropods such as mosquitoes and ticks but also has long-lasting repellency, and thus it may be used as a hematophagous arthropod repellent for protecting animals including humans.

10 Claims, No Drawings

HEMATOPHAGOUS ARTHROPOD REPELLENT COMPOSITION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/000577, filed Jan. 12, 2018, which claims priority to the benefit of Korean Patent Application No. 10-2017-0020600 filed in the Korean Intellectual Property Office on Feb. 15, 2017, the entire contents of which are incorporated herein by reference.

TECHNICAL FIELD

The present invention relates to a hematophagous arthropod repellent composition, more specifically, a repellent composition against hematophagous arthropods which transmit diseases to animals including humans, or directly cause discomfort or stress by bloodsucking.

BACKGROUND ART

Hematophagous arthropods are the animals which transmit diseases by sucking blood not only from animals like poultry but also from humans or cause a stress like sleep disruption and weight loss by direct bloodsucking, and examples of the hematophagous arthropods include a mosquito, a tick (tick, chigger tick, or the like), a fly (stable fly, black fly, tsetse fly, or the like), a gadfly, a crab lice (*Pthirus pubis*), a bedbug, a mite, or the like.

Among those arthropods, a mosquito transmits a infectious disease like malaria, yellow fever, dengue fever, Japanese encephalitis, West Nile virus, zika virus, chikungunya, or the like to humans (Service, M. W., Management of vectors. In: Youdeowei, A., Service, M. W. (Eds.), Pest and Vectors Management in the Tropics, pp. 265-280, 1983). Furthermore, the arachnid arthropods which parasitize mainly on animals like chigger tick and *Haemaphysalis longicornis* are major mediators transmitting Lyme disease, spotted fever, rickettsia, severe fever with thrombocytopenia syndrome, tsutsugamushi disease, or the like.

A repellent is known as the most suitable means for blocking disease transmission caused by hematophagous arthropods. The organic synthetic repellent commercially available from 1950s and most widely used until now is DEET (N,N-diethyl-m-toluamide) of which repellency has been recognized against various insects including mosquito (McCabe, E. T. et al., Insect repellents, III. N,N-diethylamides, Journal of Organic Chemistry. 19: 493-498, 1954). However, DEET is known to have, as much as its excellent effect, various side effects like unpleasant smell, damages on plastics or rubber, inhibition of a central nervous system, causing dermatitis, DNA damages of mammal, or the like (Katz, T. M., J. H. Miller, and A. A. Hebert, Insect repellents: historical perspectives and new developments. J. Am. Acad. Dermatol. 58: 865-871, 2008).

As another organic synthetic repellent, a hydrazide compound and a harmful arthropod-controlling agent containing the hydrazide compound are disclosed in Korean Patent Application Publication No. 2009-0130037, and 1,2,4-thiadiazole compounds and an arthropod controlling composition containing the 1,2,4-thiadiazole compounds are disclosed in Korean Patent Registration No. 1012547. Furthermore, in Korean Patent Application Publication No. 2016-0079851, substituted benzamides for controlling arthropods are disclosed.

In recent years, studies are made on use of a plant essential oil as a raw material of a hematophagous arthropod repellent. However, the plant essential oil generally has lower efficacy for hematophagous arthropods like mosquito and tick and lower repellent persistency when compared to the organic synthetic repellent, and thus there is a problem that it has to be used in a large amount.

Under the circumstances, the inventors of the present invention made an effort to solve the above problems, and, as a result, found that 3,4-dimethoxybenzaldehyde and vanillin acetate have an excellent repellent effect against hematophagous arthropods, and, when they are used as a mixture at specific ratio with other plant essential oil having rather low repellent effect, the repellent effect can be maximized. The present invention is completed accordingly.

SUMMARY

Object of the present invention is to provide a hematophagous arthropod repellent composition which exhibits excellent repellency and long-lasting protection against hematophagous arthropods.

To achieve the aforementioned object, the present invention provides a hematophagous arthropod repellent composition comprising 3,4-dimethoxybenzaldehyde or vanillin acetate as an effective ingredient In the present invention, it is characterized in that the hematophagous arthropod repellent composition additionally comprises one or more types of plant essential oil selected from the group consisting of anis, bay, calamus, cananga, celery seed, davana, myrrh, neroli, patchouli, parsley seed, tarragon, litsea cubeba, and wintergreen.

In the present invention, it is characterized in that the hematophagous arthropod is a tick or a mosquito.

In the present invention, it is characterized in that the plant essential oil is one or more types selected from the group consisting of litsea cubeba and wintergreen.

In the present invention, it is characterized in that the mixing ratio between the plant essential oil and 3,4-dimethoxybenzaldehyde is 1:1 to 1:5 in terms of weight ratio.

In the present invention, it is characterized in that the mixing ratio between the plant essential oil and vanillin acetate is 1:1 to 1:5 in terms of weight ratio.

The hematophagous arthropod repellent composition according to the present invention not only has excellent repellency against hematophagous arthropods such as mosquitoes and ticks but also has long-lasting repellency, and thus it may be used as a hematophagous arthropod repellent for protecting animals including humans.

DETAILED DESCRIPTION

In the present invention, a search is made for a novel synthetic compound having repellency against hematophagous arthropods.

In one example of the present invention, the repellency of synthetic compounds was evaluated by using mosquito and tick, which are representative hematophagous arthropods, as a subject. As a result, it became possible to confirm that 3,4-dimethoxybenzaldehyde and vanillin acetate exhibit repellency against mosquito and tick, which are hematophagous arthropods.

As such, according to one aspect, the present invention relates to a hematophagous arthropod repellent composition which is characterized by comprising 3,4-dimethoxybenzaldehyde or vanillin acetate.

Meanwhile, it is expected in the present invention that, when plant essential oil that is known to be more environmentally friendly and has fewer side effects is used with 3,4-dimethoxybenzaldehyde or vanillin acetate at specific mixing ratio, the repellent effect against hematophagous arthropods can be maximized due to the synergistic effect while the use amount of 3,4-dimethoxybenzaldehyde or vanillin acetate as synthetic compounds is reduced.

According to another example of the present invention, it was confirmed that, when plant essential oil and 3,4-dimethoxybenzaldehyde are used together, the repellency and repellent persistency against adult *Aedes albopicus* are enhanced compared to a case in which the plant essential oil or 3,4-dimethoxybenzaldehyde is used alone.

As such, the hematophagous arthropod repellent composition of the present invention is characterized in that it additionally comprises plant essential oil.

The plant essential oil is obtained from a plant, and it can be obtained by using any one of the methods like enfleurage, maceration, hot water extraction, fermentation extraction, filtration leaching, and supercritical fluid extraction using a common solvent (for example, water, ethanol, acetone, methanol, propanol, ether, hexane, ethyl acetate, chloroform, or a mixture solvent). More preferably, it may be plant essential oil which is obtained by water vapor distillation. Furthermore, the essential oil may be oil which is obtained separately from a different plant part like roots, stems, leaves, fruit flesh, flowers, fruits, seeds, and/or skins, or from the entire plant.

In the present invention, the plant essential oil can be used without any particular limitation as long as it has a repellent activity against hematophagous arthropods and exhibits the synergistic effect when used together with 3,4-dimethoxybenzaldehyde or vanillin acetate. Examples of the plant essential oil include anis, bay, calamus, cananga, celery seed, davana, myrrh, neroli, patchouli, parsley seed, tarragon, litsea cubeba, and wintergreen, but it is not limited thereto.

In the present invention, the mixing ratio between the plant essential oil and 3,4-dimethoxybenzaldehyde or vanillin acetate is preferably 1:1 to 1:5 in terms of weight ratio in consideration of maximizing the intermixing property and repellency. More preferably, the mixing ratio is 1:4.

In the present invention, the hematophagous arthropods to which the hematophagous arthropod repellent composition can be applied mean all living organisms which maintain their lives by collecting blood or body fluid from mammalian skin or avian skin, and examples thereof include insects belonging to family Culicidae, hematophagous flies such as stable fly, tsetse fly, gadfly, or the like, bedbug, crab lice (*Pthirus pubis*), and lice, but they are not limited thereto.

The hematophagous arthropod repellent composition according to the present invention may be formulated by further comprising a suitable additive, vehicle, or carrier depending on the purpose of use or environment for application. The vehicle or carrier may be a material which is commonly used for enhancing the easiness of use, economic efficiency, formulation, or repellency and repellent time. Examples thereof include a fragrance, an emulsifying agent, alcohols, and a dispersant, but it is not limited thereto.

Examples of the formulation include an aerosol, a pump spray, a granule, a powder, a dispersion, a fine granule, a capsule, an ointment, a cream, a bead, a tablet, an extract, a fluid extract, and a lotion, but it is not limited thereto. Preferably, the formulation can be applied as a cream, a pump spray, or an aerosol.

The hematophagous arthropod repellent composition of the present invention can be directly dispersed or scattered in an area in which hematophagous arthropods are mainly found, or it may be directly used on a skin of a mammal including human and livestock or a skin of a bird. Furthermore, the composition may be directly applied to household goods like clothing, bag, band, tent, or the like, or to inside of a house.

When the hematophagous arthropod repellent composition is applied to an area in which hematophagous arthropods are mainly found, the application can be made by direct dispersing or scattering in air. For example, when the composition is applied to a limited space like an inside of a building, a porous support for continuous release of the repellent composition can be employed.

When the hematophagous arthropod repellent composition is directly used on a skin of a mammal or a skin of a bird, use thereof can be made by applying or spraying a suitable amount on a skin. In a case in which the composition is directly used on a skin, there should be no irritation, and, if any, it should be extremely small so as not to cause any skin trouble.

Furthermore, when the hematophagous arthropod repellent composition is applied to household goods, by preparing a capsule in which the repellent composition is supported and directly incorporating the capsule during production of materials of the household goods such as cloth, fabric, band, or plastics, use can be made to exhibit the repellency as the supported repellent composition is scattered into the air in accordance with breakage of the capsule by friction, or as the composition is directly incorporated and later gradually released to the air.

The hematophagous arthropod repellent composition according to the present invention can be used for household appliances such as air cleaner, air conditioner, air cooler, or the like. Application to those household appliances can be suitably modified by a common method.

EXAMPLES

Hereinbelow, the present invention is explained in greater detail in view of the Examples. However, it is evident that the following Examples are given only for exemplification of the present invention and it would be evident for a person who has common knowledge in the pertinent art that by no means the scope of the present invention is understood to be limited by those Examples.

Preparation of Materials and Composition

Vanillin, vanillin isobutyrate, vanillin acetate, 3,4-dimethoxybenzaldehyde, 4-benzyloxy-3-methoxybenzaldehyde, 4-hydroxy-3-methoxybenzylamine hydrochloride, vanillyl acetone, tert-butyl 4-formyl-2-methoxyphenyl carbonate, eugenol, and the like were purchased from Tokyo Chemical Industry (TCI Chemical, Tokyo, Japan), and anis, bay, calamus, cananga, celery seed, davana, myrrh, neroli, patchouli, parsley seed, tarragon, litsea cubeba, and wintergreen were purchased from Berje, Bloomfield, N.J., USA.

Insects for Test

In general, each hematophagous arthropod has different active time in which it searches for a host for bloodsucking or exhibits a strong hematophagous activity. In the present invention, *Aedes aegypti* (or *Aedes albopictus*) which shows a strong hematophagous activity even during daytime, and *Haemaphysalis longicornis* which is an important disease-transmitting pest were selected as representative insects for testing ticks.

*Aedes aegypti* used for the indoor test was the mosquito colony which has been sub-cultured inside a building for several years without being exposed to any insecticides, and grown and kept by Seoul National University. Furthermore, for *Aedes albopicus,* eggs of the line under the management by the Korea Centers for Disease Control and Prevention were obtained, and cultured and used in the present invention. Furthermore, as for the nymphs of *Haemaphysalis longicornis,* the outdoor type collected from the region around Bongdam-Myon, Hwasung-Shi, Kunggi-Do, South Korea, was used.

During the culture, to induce spawning, the mosquitoes were allowed to have direct bloodsucking from a mouse, and maintained by supplying 10% (w/v) sugar water so as to obtain additional carbohydrates that are in need. The larva was added to a plastic tray (24×35×5 cm) and provided with 0.5 g of sterile artificial feed (40-mesh powder for baby fishes/yeast, 4:1, w/w).

Ticks were collected from an outdoor field, and, after being added to a vial lined with cotton wool to which moisture has been applied in advance, transferred to the test room. The ticks were maintained at conditions including temperature of 26±2° C., relative humidity of 70±5%, and light:dark hours of 16:8 hours.

Method for Exposure to Skin

<Mosquito Repellency>

For determining the repellency of prepared samples against adults of *Aedes aegypti* and *Aedes albopicus,* a cage-in-arm test was carried out as a method for exposure to skin. Namely, on a back of the hand of a rubber glove, a hole with diameter of 5 cm was created, and, onto an exposed back of the testees, various samples prepared by dissolution in 100 µl of ethanol were applied, and then the skin test was carried out. The testees were healthy males between the ages of 21 and 40. The control group was treated with 100 µl of ethanol only. Female adults (5 to 8 day old) of *Aedes aegypti* or *Aedes albopicus* (250 to 300 mosquitoes) were added to a cage for growing adult mosquitoes (25×25×25 cm³), and adapted to the indoor conditions for 12 to 24 hours before starting the test. When the upper arm of the control group is exposed for 1 minute and at least 6 mosquitoes sit on the upper arm or show a bloodsucking behavior, it was determined as sufficient biting pressure, and then the repellency test was carried out. With an interval of 30 minutes, by exposing the upper arm, which has been treated with the above composition, for 3 minutes, and, when the adult mosquito sits on the arm for 2 seconds or longer or at least two mosquitoes showing the behavior of mouth injection to skin or direct bloodsucking are found from consecutive tests, the test was stopped. The time period between the time point with initial treatment of a material and the time point at which 2 or more mosquitoes continuously sit on the treatment area or show the bloodsucking behavior was defined as complete protection time (CPT). Furthermore, for obtaining the repellency with regard to concentration, exposure was made for a constant time period regardless of the above and the repellency was calculated by using the following formula. Accordingly, the effect was compared among each test samples. All tests were carried out in triplicate.

Repellency %=(Number of insects showing bloodsucking behavior in non-treatment group−Number of insects showing bloodsucking behavior in treatment group)/Number of insects showing bloodsucking behavior in non-treatment group)×100

<Tick Repellency>

By having the outdoor group of *Haemaphysalis longicornis* collected from the region around Bongdam-Myon, Hwasung-Shi, Kunggi-Do, South Korea as a subject, the repellency against ticks was determined by employing a finger-tip method. In 50 µl of ethanol, each sample was dissolved in an amount of 2 mg, and then treated on the second nodule of a third finger. With an interval of 5 minutes, 10 tick nymphs were released on the fingernail, every twenty-five minutes after the treatment, and the repellency was evaluated. All tests were carried out in triplicate.

Repellency %=(Number of insects showing bloodsucking behavior in non-treatment group−Number of insects showing bloodsucking behavior in treatment group)/Number of insects showing bloodsucking behavior in non-treatment group)×100

Example 1

Evaluation of Repellency of Synthetic Compounds Against Hematophagous Arthropods 1-1: Evaluation of Repellency Against *Aedes aegypti*

To evaluate the repellency of the synthetic compounds (4 mg) of Table 1 against adult *Aedes aegypti,* the aforementioned cage-in-arm test was carried out and the complete protection time (CPT) is shown in Table 1.

TABLE 1

| Material | CPT, minutes |
| --- | --- |
| Vanillin | 30 |
| Vanillin isobutyrate | 45 |
| Vanillin acetate | 63 |
| 3,4-Dimethoxybenzaldehyde | 70 |
| 4-Benzyloxy-3-methoxybenzaldehyde | 22 |
| 4-Hydroxy-3-methoxybenzylamine hydrochloride | 10 |
| Vanillyl acetone | 10 |
| tert-Butyl 4-formyl-2-methoxyphenyl carbonate | 10 |
| Eugenol | 10 |
| DEET | 90 |

According to Table 1, CPT of vanillin was 30 minutes, CPT of vanillin isobutyrate was 45 minutes, CPT of vanillin acetate was 63 minutes, CPT of 3,4-demethoxybenzaldehyde was 70 minutes, CPT of 4-benzyloxy-3-methoxybenzaldehyde was 22 minutes, CPT of 4-hydroxy-3-methoxybenzylamine hydrochloride was 10 minutes, CPT of vanillyl acetone CPT of 10 minutes, CPT of tert-butyl 4-formyl-2-methoxyphenyl carbonate was 10 minutes, CPT of eugenol, which is a natural positive control compound, was 10 minutes, and CPT of DEET, which has been used as a synthetic positive control compound, was 90 minutes.

Namely, DEET as a control compound showed the most excellent repellency followed by 3,4-dimethoxybenzaldehyde and vanillin acetate, which showed the CPT of more than 1 hour, and thus indicating that they have much more excellent repellency compared to eugenol, which shows CPT of 10 minutes, as a plant-derived control compound.

1-2: Evaluation of Repellency Against *Aedes albopicus*

To determine the repellency of 3,4-dimethoxybenzaldehyde, which has been found to exhibit excellent repellency against adult *Aedes aegypti* in 1-1 above, against other hematophagous arthropods, 4 concentration blocks were set for *Aedes albopicus,* and the cage-in-arm test was carried out for 180 minutes. Then, the repellency was calculated and shown in Table 2. For reference, comparison of the mosquito repellency was made by using clove oil as a natural positive control group and DEET as a synthetic positive control group.

1-3: Evaluation of Repellency Against *Haemaphysalis longicornis*

To determine the repellency of 3,4-dimethoxybenzaldehyde, which has been found to exhibit excellent repellency against adult *Aedes aegypti* in 1-1 above, against other hematophagous arthropods, 4 concentration blocks were set for nymphs of *Haemaphysalis longicornis,* and the finger-tip method was carried out therefor for 300 minutes. The results are shown in Table 3.

TABLE 3

| mg/cm² | Repellency (mean ± SE, %) | | | | | | | | | |
|---|---|---|---|---|---|---|---|---|---|---|
| | 15 min. | 30 min. | 60 min. | 90 min. | 120 min. | 150 min. | 180 min. | 210 min. | 240 min. | 270 min. | 300 min. |
| 0.01 | 100 ± 0 | 100 ± 0 | 98 ± 2.5 | 98 ± 2.5 | 90 ± 5.8 | 95 ± 2.9 | 95 ± 2.9 | 73 ± 10.3 | 65 ± 2.9 | 43 ± 4.8 | — |
| 0.02 | 100 ± 0 | 100 ± 0 | 100 ± 0 | 98 ± 2.5 | 98 ± 2.5 | 100 ± 0 | 98 ± 2.5 | 95 ± 5.0 | 85 ± 2.9 | 63 ± 4.8 | 48 ± 2.5 |
| 0.05 | 100 ± 0 | 100 ± 0 | 100 ± 0 | 98 ± 2.5 | 98 ± 2.5 | 85 ± 2.9 | 83 ± 6.3 | 85 ± 6.5 | 78 ± 4.8 | 70 ± 4.1 | 50 ± 4.1 |
| 0.09 | 100 ± 0 | 100 ± 0 | 100 ± 0 | 98 ± 2.5 | 100 ± 0 | 100 ± 0 | 100 ± 0 | 98 ± 2.5 | 83 ± 2.5 | 73 ± 6.3 | 65 ± 2.9 |

According to Table 3, it was found that 3,4-dimethoxybenzaldehyde shows time- and treatment time-dependent repellency also against *Haemaphysalis longicornis*. When the treatment level is 0.02 mg/cm² or higher, the repellency of 78% or higher was maintained against *Haemaphysalis longicornis* even 4 hours after the treatment. At 0.01 mg/cm², the repellency of 65% was maintained.

From the above results, it was recognized that, for mosquitoes and ticks, 3,4-dimethoxybenzaldehyde exhibits more excellent repellency than clove, which is an effective ingredient of a natural repellent commercially available in South Korea.

TABLE 2

| Material | mg/cm² | Repellency (mean ± SE, %) | | | | | | |
|---|---|---|---|---|---|---|---|---|
| | | 10 minutes | 30 minutes | 60 minutes | 90 minutes | 120 minutes | 150 minutes | 180 minutes |
| 3,4-Dimethoxy benzaldehyde | 0.25 | 100 ± 0 | 100 ± 0 | 100 ± 0 | 100 ± 0 | 100 ± 0 | 95 ± 3.2 | 58 ± 4.4 |
| | 0.20 | 100 ± 0 | 100 ± 0 | 99 ± 2.3 | 94 ± 4.6 | 91 ± 1.7 | 83 ± 2.6 | 65 ± 6.0 |
| | 0.10 | 100 ± 0 | 93 ± 4.3 | 90 ± 4.1 | 83 ± 8.8 | 58 ± 5.5 | — | — |
| | 0.03 | 100 ± 0 | 75 ± 7.1 | 54 ± 4.3 | — | — | — | — |
| DEET | 0.25 | 100 ± 0 | 100 ± 0 | 100 ± 0 | 100 ± 0 | 100 ± 0 | 100 ± 0 | 84 ± 4.3 |
| | 0.20 | 100 ± 0 | 100 ± 0 | 100 ± 0 | 100 ± 0 | 95 ± 3.3 | 96 ± 1.2 | 85 ± 3.0 |
| | 0.10 | 100 ± 0 | 96 ± 2.6 | 86 ± 4.2 | 83 ± 4.3 | 82 ± 9.5 | 57 ± 5.2 | 27 ± 3.8 |
| | 0.03 | 77 ± 5.8 | 67 ± 3.3 | 69 ± 6.9 | 19 ± 5.2 | — | — | — |
| Clove | 0.25 | 100 ± 0 | 93 ± 2.6 | 69 ± 4.9 | 24 ± 4.7 | — | — | — |
| | 0.20 | 100 ± 0 | 80 ± 3.0 | 60 ± 4.7 | 22 ± 4.4 | — | — | — |
| | 0.10 | 98 ± 2.0 | 57 ± 6.7 | 44 ± 4.0 | — | — | — | — |
| | 0.03 | 50 ± 3.8 | 16 ± 3.5 | — | — | — | — | — |

According to Table 2, the clove used as a positive control group showed a rapid decrease in repellency, i.e., under the treatment for 60 minutes, repellency of 69% at 0.25 mg/cm² treatment, repellency of 60% at 0.20 mg/cm² treatment, and repellency of 44% at 0.10 mg/cm² treatment, On the other hand, at the all treatment concentration levels, 3,4-dimethoxybenzaldehyde showed the repellency that is comparable to DEET as a positive control group. In terms of CPT, this repellency was also comparable to DEET.

Example 2

Evaluation of Repellency of Mixture Sample Containing Essential Oil and Synthetic Compound Against Hematophagous Arthropods 2-1: Evaluation of Repellency of Essential Oil Alone Against Hematophagous Arthropods To determine the repellency of plant essential oil alone against adult *Aedes albopicus* and nymphs of *Haemaphysa* lis longicornis, the cage-in-arm test and finger-tip method were carried out, in the same manner as Examples 1-2 and 1-3, with each of 16 kinds of plant essential oil of Table 4. Then, the repellency was calculated and shown in Table 4. calamus), 2 types showing medium activity (cananga, wintergreen), and 2 types showing low activity (basil, litsea cubeba), and they were admixed with each other at ratio of 1:1, 1:4, or 4:1. Then, the cage-in-arm test was carried out.

TABLE 4

| | Concentration, mg | | Repellency (mean ± SE, %) | | | | | |
|---|---|---|---|---|---|---|---|---|
| | | | 30 minutes | | 60 minutes | | 90 minutes | |
| Material | H. longicornis | A. albopicus | H. longicornis | A. albopicus | H. longicornis | A. albopicus | H. longicornis | A. albopicus |
| Anis | 2 | 4 | 93 ± 3.3 | 83 ± 8.8 | 53 ± 3.3 | 66 ± 3.3 | 30 ± 5.8 | 28 ± 5.8 |
| Basil | 2 | 4 | 43 ± 8.8 | 63 ± 5.8 | — | 24 ± 5.8 | — | — |
| Bay | 2 | 4 | 100 ± 0 | 100 ± 0 | 70 ± 5.8 | 70 ± 5.8 | 50 ± 5.8 | 16 ± 3.7 |
| Calamus | 2 | 4 | 93 ± 3.3 | 88 ± 5.8 | 53 ± 3.3 | 43 ± 8.8 | — | — |
| Cananga | 2 | 4 | 87 ± 3.3 | 78 ± 3.3 | 60 ± 5.8 | 63 ± 6.3 | 27 ± 8.8 | 33 ± 3.3 |
| Carrot seed | 2 | 4 | 70 ± 5.8 | 54 ± 5.8 | 50 ± 5.8 | 24 ± 3.3 | 33 ± 3.3 | — |
| Celery seed | 2 | 4 | 93 ± 3.3 | 86 ± 3.3 | 70 ± 5.8 | 48 ± 5.8 | 40 ± 5.8 | — |
| Davana | 2 | 4 | 83 ± 3.3 | 73 ± 3.3 | 67 ± 3.3 | 54 ± 6.7 | 33 ± 3.3 | 13 ± 8.8 |
| Litsea cubeba | 2 | 4 | 50 ± 5.8 | 86 ± 3.3 | 33 ± 3.3 | 44 ± 5.8 | — | — |
| Myrrh | 2 | 4 | 83 ± 3.3 | 63 ± 3.3 | 73 ± 6.7 | 33 ± 5.8 | 50 ± 10.0 | — |
| Neroli | 2 | 4 | 93 ± 3.3 | 70.2 ± 1.1 | 57 ± 6.7 | 57.5 ± 3.3 | 33 ± 8.8 | 48.2 ± 0.8 |
| Patchouly | 2 | 4 | 93 ± 3.3 | 63 ± 3.3 | 30 ± 5.8 | 24 ± 5.8 | — | — |
| Parsley seed | 2 | 4 | 97 ± 3.3 | 59.7 ± 6.7 | 90 ± 5.8 | 36.4 ± 2.5 | 67 ± 6.7 | — |
| Tarragon | 2 | 4 | 97 ± 3.3 | 33.5 ± 5.8 | 77 ± 3.3 | 19.5 ± 3.8 | 40 ± 10.0 | — |
| Tea tree | 2 | 4 | 63 ± 3.3 | 48 ± 3.3 | 43 ± 3.3 | — | — | — |
| Wintergreen | 2 | 4 | 67 ± 3.3 | 87 ± 5.8 | 10 ± 0.0 | 62 ± 8.8 | — | 24 ± 5.8 |

According to Table 4, it was found that, 30 minutes after the treatment, the plant essential oil showing the strong repellency of 90% or higher for both 2 types of hematophagous arthropods was bay and celery seed, and the plant essential oil showing the strong repellency of 90% or higher for *Haemaphysalis longicornis* was anis, bay, calamus, celery seed, neroli, patchouli, parsley seed, and tarragon.

Furthermore, the plant essential oil showing the strong repellency of 80% or higher for *Haemaphysalis longicornis* even after 30 minutes was cananga, davana, myrrh, or the like, and the plant showing the strong repellency of 80% or higher for adult *Aedes albopicus* was anis, bay, calamus, celery seed, litsea cubeba, wintergreen, or the like.

The repellency of those plant essential oils tends to decrease over time, i.e., 60 minutes after the treatment, the plant showing the repellency of 70% or higher for *Haemaphysalis longicornis* and *Aedes albopicus* was bay and parsley seed showed the strong repellency of 90% for *Haemaphysalis longicornis*. However, 90 minutes after the treatment, most of the plants showing the repellency exhibited dramatically decreased repellency of 50% or lower.

2-2: Evaluation of Repellency of Mixed Essential Oil Against Hematophagous Arthropods As it has been shown in 2-1, plant essential oil has a problem that, after an application on a skin, a change in concentration occurs due to a loss as caused by evaporation into air or absorption into skin. To solve this problem, it was examined whether or not mixing 2 types of plant oil at suitable ratio can exhibit enhanced repellency against mosquitoes.

Because it is practically impossible to have evaluations for entire combinations of the 16 types of an essential oil, 6 types were selected, i.e., 2 types showing high activity (bay, The repellency was calculated and given in Table 5.

TABLE 5

| | | Repellency (mean ± SE, %) | | |
|---|---|---|---|---|
| Mixed essential oil | | 30 minutes | 60 minutes | 90 minutes |
| Bay:calamus | 2 mg:2 mg | 90 ± 2.7 | 83 ± 4.2 | 38 ± 6.3 |
| | 1 mg:4 mg | 98 ± 3.3 | 97 ± 1.8 | 63 ± 3.3 |
| | 4 mg:1 mg | 100 ± 0 | 91 ± 5.1 | 58 ± 4.7 |
| Bay:wintergreen | 2 mg:2 mg | 88 ± 5.8 | 83 ± 4.6 | 63 ± 3.3 |
| | 1 mg:4 mg | 86 ± 5.1 | 74 ± 4.8 | 44 ± 2.4 |
| | 4 mg:1 mg | 100 ± 0 | 98 ± 1.2 | 65 ± 1.7 |
| Bay:litsea cubeba | 2 mg:2 mg | 93 ± 1.7 | 88 ± 2.7 | 30 ± 5.8 |
| | 1 mg:4 mg | 95 ± 2.1 | 71 ± 6.4 | 53 ± 3.3 |
| | 4 mg:1 mg | 100 ± 0 | 78 ± 4.2 | 54 ± 4.8 |
| Cananga:wintergreen | 2 mg:2 mg | 78 ± 2.8 | 54 ± 5.1 | 24 ± 1.6 |
| | 1 mg:4 mg | 95 ± 1.2 | 62 ± 3.9 | 45 ± 5.1 |
| | 4 mg:1 mg | 88 ± 5.8 | 82 ± 3.1 | 62 ± 3.9 |
| Canaga:litsea cubeba | 2 mg:2 mg | 63 ± 6.3 | 45 ± 5.1 | — |
| | 1 mg:4 mg | 84 ± 2.9 | 65 ± 3.6 | 31 ± 8.8 |
| | 4 mg:1 mg | 98 ± 1.7 | 71 ± 5.8 | 33 ± 3.3 |
| Basil:litsea cubeba | 2 mg:2 mg | 62 ± 3.9 | 28 ± 1.4 | — |
| | 1 mg:4 mg | 92 ± 1.8 | 70 ± 2.3 | 40 ± 3.5 |
| | 4 mg:1 mg | 77 ± 4.0 | 56 ± 4.3 | 16 ± 3.8 |

From Table 5, it is recognized that more enhanced repellency can be obtained with broad intermixing ratio like 1:4 or 4:1 than 1:1 between the two kinds of essential oil with strong repellent activity (i.e., bay, calamus). This tendency remains the same for the combination between the essential oils with low repellency (i.e., basil, litsea cubeba).

Furthermore, it is found that mixing at suitable ratio of the plant essential oils showing the repellency at certain level leads to more enhanced repellency compared to the treatment with essential oil alone, when determination is made with the same quantity.

As such, it is found that, for development of a repellent, mixing oils at suitable ratio (1:4 or 4:1) rather than simple mixing of them is much more favorable for having protection of humans from hematophagous pest.

2-3: Evaluation of Repellency of Synthetic Compound and Essential Oil Against Hematophagous Arthropods To determine the synergistic repellent effect against hematophagous arthropods according to mixed use of a synthetic compound and a plant essential oil, litsea cubeba found to have low repellency when it is used alone was admixed with the synthetic compound evaluated in the above 1-1 at mixing ratio of 1:1, 1:4, or 4:1. Then, the cage-in-arm test was carried out against adult *Aedes aegypti* and the complete protection time (CPT) is shown in Table 6.

TABLE 6

| Mixture of essential oil and synthetic compound | | CPT |
|---|---|---|
| *Litsea cubeba* oil:Vanillin | 2 mg:2 mg | 30 |
| | 1 mg:4 mg | 90 |
| | 4 mg:1 mg | 30 |
| *Litsea cubeba* oil:Vanillin isobutyrate | 2 mg:2 mg | 10 |
| | 1 mg:4 mg | 33 |
| | 4 mg:1 mg | 20 |
| *Litsea cubeba* oil:Vanillin acetate | 2 mg:2 mg | 50 |
| | 1 mg:4 mg | 60 |
| | 4 mg:1 mg | 30 |
| *Litsea cubeba* oil:3,4-Dimethoxybenzaldehyde | 2 mg:2 mg | 70 |
| | 1 mg:4 mg | 105 |
| | 4 mg:1 mg | 50 |
| *Litsea cubeba* oil:4-Benzyloxy-3-methoxybenzaldehyde | 2 mg:2 mg | 50 |
| | 1 mg:4 mg | 60 |
| | 4 mg:1 mg | 40 |
| *Litsea cubeba* oil:4-Hydroxy-3-methoxybenzylamine hydrochloride | 2 mg:2 mg | 20 |
| | 1 mg:4 mg | 10 |
| | 4 mg:1 mg | 20 |
| *Litsea cubeba* oil:Vanillyl acetone | 2 mg:2 mg | 20 |
| | 1 mg:4 mg | 30 |
| | 4 mg:1 mg | 30 |
| *Litsea cubeba* oil:tert-Butyl 4-formyl-2-methoxyphenyl carbonate | 2 mg:2 mg | 30 |
| | 1 mg:4 mg | 30 |
| | 4 mg:1 mg | 10 |
| *Litsea cubeba* oil:Eugenol | 2 mg:2 mg | 10 |
| | 1 mg:4 mg | 30 |
| | 4 mg:1 mg | 20 |
| DEET | 4 mg | 90 |

From Table 6, it is recognized that, when used with litsea cubeba as a plant essential oil, vanilin, 4-benzyloxy-3-methoxybenzaldehyde, 3,4-dimethoxybenzaldehyde, canillyl acetone, 4-hydroxy-3-methoxybenzylamine hydrochloride, and tert-butyl 4-formyl-2-methoxyphenyl carbonate showed enhanced repellency than a case in which each of the compounds is used alone, and, in particular, 3,4-dimethoxybenzaldehyde showed greatly enhanced repellency according to the mixed use.

2-4: Evaluation of Repellency of 3,4-dimethoxybenzaldehyde and Wintergreen Essential Oil Against Hematophagous Arthropods To determine the synergistic repellent effect against hematophagous arthropods according to mixed use of a synthetic compound and a plant essential oil, the cage-in-arm test was carried out for adult *Aedes albopicus* by using only the wintergreen which has been found to have medium repellency when used alone, or 3,4-dimethoxybenzaldehyde which has been found to have excellent repellency, or a mixture of them in which they are admixed with each other at mixing ratio of 1:4. The complete protection time (CPT) is shown in Table 7.

TABLE 7

| Composition | CPT, minutes |
|---|---|
| WG 4 mg | 30 |
| DBA 4 mg | 50 |
| WG 5 mg + DBA 20 mg (1:4) | 480 |
| WG 0.5 mg + DBA 2 mg (1:4) | 240 |
| Eugenol (clove) 4 mg | 10 |
| DEET 4 mg | 90 |

WG, winter green oil;
DBA, 3,4-dimethoxy benzaldehyde.

From Table 7, it was found that, compared to a case in which the treatment is carried out with wintergreen (WG, 4 mg) alone or 3,4-dimethoxybenzaldehyde (4 mg) alone, remarkably higher CPT is obtained when the wintergreen and 3,4-dimethoxybenzaldehyde are used as a mixture (5 mg:20 mg or 0.5 mg:2 mg), and the result is also remarkably higher than the clove and DEET as a positive control group, showing CPT of 10 minutes and 90 minutes, respectively.

2-5: Evaluation of Repellency of 3,4-dimethoxybenzaldehyde and Icaridin Against Hematophagous Arthropods To evaluate the possibility of commercialization of 3,4-dimethoxybenzaldehyde, an emulsion (spray type) containing 7% icaridin, which is widely used as a chemically synthesized repellent, 3.5% of icaridin, and 3.5% of 3,4-dimethoxybenzaldehyde were dissolved in ethanol and added into a manual sprayer. After applying the mixture evenly on a lower part of a wrist, exposure to a cage (35×35×35 cm) in which 160 adult females of *Aedes albopicus* collected 5 to 10 days after their emergence are contained was made for 3 minutes with an interval of 1 hour. Then, CPT was measured and the result is shown in Table 8.

TABLE 8

| Composition | CPT, minutes mean ± SE | F-value | t-test |
|---|---|---|---|
| 3,4-Dimethoxybenzaldehyde 3.5% + Icaridin 3.5% | 177 ± 21.2 | 0.15712 ($P > 0.05$) | 0.0281 |
| 7% Icaridin preparation | 113 ± 13.6 | | |

From Table 8, it is found that, compared to the 7% icaridin preparation, the 7% mixture preparation (i.e., icaridin 3.5%+ 3,4-dimethoxybenzaldehyde 3.5%) having the same amount of effective components shows enhanced repellency of 60 minutes or longer, which is statistically significant ($P=0.05$).

Test Example 1

Evaluation of Indoor Repellency of 3,4-dimethoxybenzaldehyde Spray

For determining the effective content for developing a repellent based on the repellency of 3,4-dimethoxybenzaldehyde, indoor repellency was evaluated. Each of the ethanol preparation containing 5%, 7%, 10%, or 15% 3,4-dimethoxybenzaldehyde, 2% clove spray, 19% DEET aerosol preparation, and 7% icaridin spray, which are approved by Ministry of Food and Drug Safety of South Korea, was applied 3 times (for aerosol preparation, 2 seconds) on a back of a hand, and after wearing rubber gloves having a 5 cm-hole formed on the back, exposure for 1 minute to a cage (35×35×35 cm) in which 120 adult females of *Aedes albopicus* (5 to 10 day old) are contained was made every 30 minutes. Then, the repellency was calculated and described in Table 9. All tests were carried out in triplicate.

TABLE 9

| Composition | conc. | % Repellency (mean ± SE, %) | | | | | | | | |
| --- | --- | --- | --- | --- | --- | --- | --- | --- | --- | --- |
| | | 10 | 30 | 60 | 120 | 180 | 240 | 300 | 360 | 420 |
| 3,4-Dimethoxybenzaldehyde spray | 5% | 100 ± 0 | 100 ± 0 | 97 ± 1.8 | 89 ± 0.7 | 83 ± 3.8 | 76 ± 4.3 | 75 ± 0.3 | 64 ± 2.7 | 54 ± 2.2 |
| | 7% | 100 ± 0 | 100 ± 0 | 100 ± 0 | 100 ± 0 | 100 ± 0 | 84 ± 7.4 | 84 ± 7.9 | 73 ± 5.8 | 69 ± 4.1 |
| | 10% | 100 ± 0 | 100 ± 0 | 100 ± 0 | 100 ± 0 | 100 ± 0 | 99 ± 0.7 | 95 ± 1.7 | 95 ± 1.8 | 88 ± 2.8 |
| | 15% | 100 ± 0 | 100 ± 0 | 100 ± 0 | 100 ± 0 | 100 ± 0 | 99 ± 0.7 | 99 ± 0.7 | 99 ± 1.7 | 97 ± 0.9 |
| Clove spray | 2% | 20 ± 4.5 | 18 ± 1.9 | — | — | — | — | — | — | — |
| DEET aerosol | 19% | 100 ± 0 | 100 ± 0 | 100 ± 0 | 100 ± 0 | 100 ± 0 | 100 ± 0 | 100 ± 0 | 99 ± 0.7 | 99 ± 0.7 |
| Icaridin spray | 7% | 100 ± 0 | 100 ± 0 | 90 ± 5.3 | 78 ± 5.7 | 66 ± 5.1 | 54 ± 5.8 | — | — | — |

From Table 9, it is shown that the 2% clove spray exhibits extremely poor repellency of 20% even after 10 minutes from the treatment. On the other hand, 15% 3,4-dimethoxybenzaldehyde spray exhibits almost the same repellency as 19% DEET aerosol preparation, and the sprays containing 3,4-dimethoxybenzaldehyde at 5% or higher have more excellent repellency than the 7% icaridin spray.

Based on the above results, it is recognized that, for development of a repellent containing 3,4-dimethoxybenzaldehyde as an effective ingredient, it is appropriate to contain 3,4-dimethoxybenzaldehyde at 5% or higher.

Test Example 2

Evaluation of Outdoor Repellency of 3,4-dimethoxybenzaldehyde Spray

To evaluate the repellency of 3,4-dimethoxybenzaldehyde against actual outdoor mosquito group, three healthy testees in their 30s to 40s, wearing short pants, were placed in the hills and bamboo forest near Ilwol reservoir of Suwon, South Korea, and the spray was applied onto the lower part of their knee. Then, the testees were exposed, while sitting on a chair for 5 to 15 minutes, to mosquitoes between 3 to 9 PM, and the CPT was measured and shown in Table 10. All tests were carried out in triplicate.

TABLE 10

| Composition | Content, % | CPT (range), minutes | Remarks |
| --- | --- | --- | --- |
| 3,4-Dimethoxybenzaldehyde spray | 4 | 45 (30-60) | Repeated 3 times |
| | 6 | 150 (120-180) | Repeated 3 times |
| | 9 | 150 (120-180) | Repeated 7 times |
| | 12 | 150 (120-180) | Repeated 3 times |
| | 15 | 180 (120-210 | Repeated 4 times |
| Icaridin spray | 7 | 140 (60-180) | Repeated 5 times |
| Clove spray | 2 | 15 | Repeated 3 times |

According to Table 10, each spray containing 3,4-dimethoxybenzaldehyde spray at 4%, 6%, 9%, 12%, or 15% has the CPT of 45 minutes, 150 minutes, 150 minutes, 150 minutes and 180 minutes, respectively, in which 6% to 12% sprays had the same CPT for the outdoor mosquito group.

The 7% icaridin spray exhibited the CPT of 140 minutes, showing similar repellency to the spray containing 3,4-dimethoxybenzaldehyde at 6% or more. However, the 2% clove spray exhibited the CPT of 15 minutes, indicating that it is not suitable as a repellent.

Hereinabove, specific parts of the present invention are explained in detail, and those specific descriptions are only a preferred embodiment for a person who has common knowledge in the pertinent art, and it is evident that the scope of the present invention is not limited by the descriptions. Accordingly, it is understood that the actual scope of the present invention is defined by the attached claims and equivalents thereof.

The invention claimed is:

1. A method for repelling a hematophagous arthropod, the method complying applying a composition comprising 3,4-dimethoxybenzaldehyde or vanillin acetate as an effective ingredient and a plant essential oil to a subject or an area in need thereof, wherein the plant essential oil comprises at least one selected from the group consisting of litsea cubeba; and wintergreen; and a mixing ratio between (i) the plant essential oil and (ii) the 3,4-dimethoxybenzaldehyde or the vanillin acetate is 1:4 in terms of weight ratio.

2. The method of claim 1, wherein the composition comprises the 3,4-dimethoxybenzaldehyde.

3. The method of claim 2, wherein the mixing ratio between (i) the plant essential oil and (ii) the 3,4-dimethoxybenzaldehyde is 1:4 in terms of weight ratio.

4. The method of claim 2, wherein the hematophagous arthropod is a tick.

5. The method of claim 2, wherein the hematophagous arthropod is a mosquito.

6. The method of claim 1, wherein the composition comprises the vanillin acetate.

7. The method of claim 6, wherein the hematophagous arthropod is a tick.

8. The method of claim 6, wherein the hematophagous arthropod is a mosquito.

9. The method of claim 1, wherein the hematophagous arthropod is *Aedes aegypti;*
    the composition comprises the 3,4-dimethoxybenzaldehyde; and
    the mixing ratio between (i) the plant essential oil and (ii) the 3,4-dimethoxybenzaldehyde is 1:4 in terms of weight ratio.

10. The method of claim 1, wherein the hematophagous arthropod is *Haemaphysalis longicornis;*
    the composition comprises the 3,4-dimethoxybenzaldehyde; and
    the mixing ratio between (i) the plant essential oil and (ii) the 3,4-dimethoxybenzaldehyde is 1:4 in terms of weight ratio.

* * * * *